United States Patent [19]

Evers et al.

[11] Patent Number: 5,264,504

[45] Date of Patent: Nov. 23, 1993

[54] GRAFT COPOLYMERS OF ARTICULATED ROD-LIKE POLYMERS

[75] Inventors: Robert C. Evers; My Dotrong, both of Dayton, Ohio

[73] Assignee: The United States of America as represented by the Secretary of the Air Force, Washington, D.C.

[21] Appl. No.: 917,568

[22] Filed: Jul. 20, 1992

Related U.S. Application Data

[62] Division of Ser. No. 602,521, Oct. 24, 1990, abandoned.

[51] Int. Cl.$^5$ ............................................. C08F 283/00
[52] U.S. Cl. .................................. 525/535; 525/394; 528/172; 528/185
[58] Field of Search ................ 525/535, 394; 528/172, 528/185

[56] References Cited

U.S. PATENT DOCUMENTS

| | | | |
|---|---|---|---|
| 4,229,566 | 10/1980 | Evers et al. | 528/172 |
| 5,030,706 | 7/1991 | Harris et al. | 525/425 |
| 5,075,392 | 12/1991 | Harris et al. | 525/425 |
| 5,110,894 | 5/1992 | Harris | 528/172 |

FOREIGN PATENT DOCUMENTS 8907617  8/1989  European Pat. Off. ............ 525/397

*Primary Examiner*—Robert E. Sellers
*Assistant Examiner*—Randy Gulakowski
*Attorney, Agent, or Firm*—Charles E. Bricker; Donald J. Singer

[57] ABSTRACT

There are provided fusible, rod-like graft copolymers having repeating units of the formula:

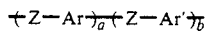

wherein a ranges from about 0.75 to 0.97 and b is 1−a; wherein Z is a benzbisoxazole or benzbisthiazole moiety, wherein Ar is a linear phenylene or polyphenylene moiety, wherein Ar' is

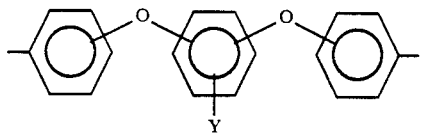

and wherein Y is a poly(etherketone) or a poly(etheretherketone), wherein the poly(etherketone) has repeating units of the formula

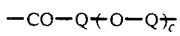

wherein Q is a divalent phenylene or substituted phenylene moiety and c is an integer having a value of 1 to 4, and the poly(etheretherketone) has repeating units of the formula

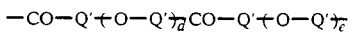

wherein Q' is a divalent phenylene or substituted phenylene moiety, d is an integer having a value of 1 to 4 and e is an integer having a value of 2 to 5.

Also provided are methods for making these graft copolymers.

4 Claims, No Drawings

GRAFT COPOLYMERS OF ARTICULATED ROD-LIKE POLYMERS

RIGHTS OF THE GOVERNMENT

The invention described herein may be manufactured and used by or for the Government of the United States for all governmental purposes without the payment of any royalty.

This is a division of application Ser. No. 07/602,521, filed Oct. 24, 1990, now abandoned.

BACKGROUND OF THE INVENTION

This invention relates to aromatic heterocyclic graft copolymers.

In general, the class of aromatic heterocyclic extended chain polymers is well known for their outstanding thermal, physical and chemical properties. Unfortunately, these polymers are essentially non-melting and have proven difficult to economically process into articles. In order to fashion such polymers into desired articles of commerce, for example, fibers, films, fibrids, and the like, it is necessary that they be in solution or dope form. Although such polymers can be dissolved in various acidic solvents, such as sulfuric acid (SA), methanesulfonic acid (MSA), chlorosulfonic acid (CSA), polyphosphoric acid (PPA), and the like, difficulty is often experienced in preparing and using the polymer-acid compositions or dopes because of poor polymer-acid solubility.

Normally, a precipitated or dried particulate form of the polymer is dissolved in a strong acidic solvent by mixing the polymer particles at elevated temperature for a period of several hours to several days. The resulting dopes often contain undissolved polymer and must be filtered before further processing into articles.

Considerable research has been directed toward using poly(p-phenylene benzbisazole) polymers as the reinforcing elements in polymeric composites. These polymers, also known as rigid-rod polymers, have a high modulus and high strength, and can act as reinforcing elements similar to the reinforcement provided by chopped fibers, but with the reinforcement taking place at the molecular level.

Development of these polymers for applications requiring bulk forms has been hindered by the difficult processibility of these polymers due to their limited solubility and complete infusibility. Previous attempts to improve polymer solubility or fusibility through modification of the polymer structures such as by the inclusion of diphenoxybenzene "swivels" or points of articulation to form articulated rod-like polymers have not been satisfactory. Processing difficulties have been somewhat circumvented by novel processing concepts and approaches such as molecular composites in which the rod-like polymer is uniformly dispersed at the molecular level in a fusible, malleable host or matrix. Implementation of this concept has previously entailed novel synthetic approaches, including the preparation of poly(p-phenylenebenzbisimidazole) structures with polypropylene side-chains. Although these copolymers could be readily processed neat at moderate temperatures and pressures to give consolidated bulk forms with good mechanical properties, they exhibited limited thermooxidative stability.

It is therefore an object of the present invention to provide aromatic heterocyclic polymers which are fusible.

Other objects, aspects and advantages of the present invention will become apparent to those skilled in the art from a reading of the following detailed description of the invention.

SUMMARY OF THE INVENTION

In accordance with the present invention, there is provided a fusible, rod-like graft copolymer having repeating units of the formula:

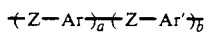

wherein a ranges from about 0.75 to 0.97 and b is 1−a; wherein Z is

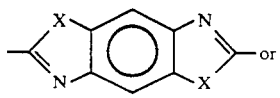

or

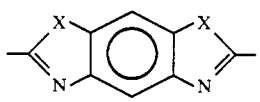

wherein X is —O— or —S—;
wherein Ar is

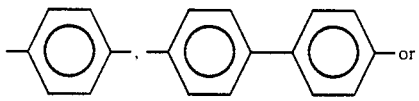

or

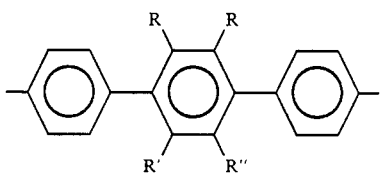

wherein R is a monovalent aromatic radical, and R' and R" are individually selected from the group consisting of hydrogen, a monovalent aromatic radical, a monovalent aliphatic radical, a monovalent cycloaliphatic radical, and a monovalent heterocyclic radical;

wherein Ar' is

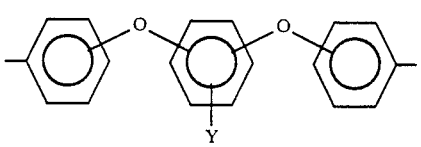

and wherein Y is a poly(etherketone) or a poly(etheretherketone), wherein the poly(etherketone) has repeating units of the formula

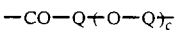

wherein Q is a divalent phenylene or substituted phenylene moiety and c is an integer having a value of 1 to 4, and the poly(etheretherketone) has repeating units of the formula

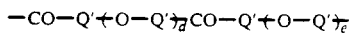

wherein Q' is a divalent phenylene or substituted phenylene moiety, d is an integer having a value of 1 to 4 and e is an integer having a value of 2 to 5.

Examples of monovalent aromatic radicals, monovalent aliphatic, cycloaliphatic and heterocyclic radicals as well as examples of various bis(phenoxy)benzene radicals are given in Evers et al, U.S. Pat. No. 4,229,566, which is incorporated herein by reference.

The graft copolymers of the present invention are prepared by grafting a poly(etherketone) or a poly(etheretherketone) onto an articulated poly(p-phenylenebenzobisoxazole) (APBO) or an articulated poly(p-phenylenebenzobisthiazole) (APBT) structure. The APBO and APBT are prepared as described in the aforementioned U.S. Pat. No. 4,229,566. Of the bis(phenoxy)benzene radicals listed therein, the 1,2-bis(1,4-phenoxy)benzene radical is presently preferred.

In carrying out the process, the APBO or APBT is dissolved in a mixture of methanesulfonicacid (MSA) and phosphorus pentoxide ($P_2O_5$). In general, the quantity of polymer is about 1 to 5 weight percent, based upon the weight of MSA, and the quantity of $P_2O_5$ is about 10 weight percent, also based upon the weight of MSA.

After a solution of the APBO or APBT in MSA/$P_2O_5$ is obtained, the grafting monomer(s) is(are) added. To prepare the poly(etherketone) (PEK) graft copolymer, a phenoxybenzoic acid is added to the reaction mixture. In general, the quantity of the graft monomer is about 1 to 10 moles per mole of APBO or APBT. Since the b portion in the APBO or APBT molecule can be varied, the quantity of the graft monomer expressed in terms of the b portion of the APBO or APBT molecule can range from about 4 to 330 moles per mole of the b portion.

Suitable phenoxybenzoic acids include 3-phenoxybenzoic acid, 4-phenoxybenzoic acid, (4'-phenoxy)-3-phenoxybenzoic acid, (4'-phenoxy)-4-phenoxybenzoic acid, (2'-phenyl)-4-phenoxybenzoic acid, and (2'-methoxy)-4-phenoxybenzoic acid.

To prepare the poly(etheretherketone) (PEEK) graft copolymer, an aromatic ether and an aromatic ether dibenzoic acid are added to the reaction mixture. In general, the quantity of the graft monomers is about 1 to 5 moles per mole of APBO or APBT. However, because these monomers are very reactive, the quantity of monomers is preferably maintained below about 3.5 mole percent to minimize crosslinking during the preparation. The above quantities comprise the combined quantity of aromatic ether and oxydibenzoic acid, these compounds being employed in substantially equimolar quantities.

Suitable aromatic ethers have the general formula:

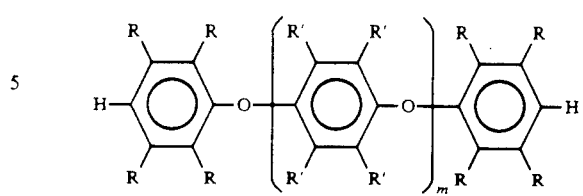

wherein m is 0 to 2, wherein R is hydrogen, alkyl having 1 to 6 carbon atoms, alkoxy having 1 to 6 carbon atoms, or phenyl, and wherein R' is R, halogen, aliphatic acyl having 2 to 5 carbon atoms or aromatic acyl having 7 to 9 carbon atoms. Examples of suitable aromatic ethers include 1,4-diphenoxybenzene, diphenylether, diphenoxyphenylether and the like.

Suitable dibenzoic acids have the general formula:

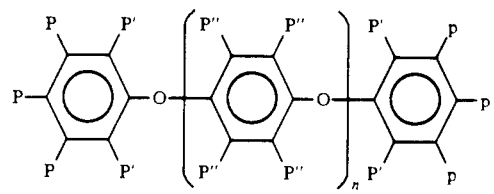

wherein n is 0 to 2, wherein one of each of P and p are —COOH or —COCl in the m- or p-position, wherein the remaining P and p are —H, halogen, alkyl having 1 to 6 carbon atoms, alkoxy having 1 to 6 carbon atoms, or phenyl, wherein P' is —H, halogen, alkyl having 1 to 6 carbon atoms, alkoxy having 1 to 6 carbon atoms, or phenyl, and wherein P" is hydrogen, alkyl having 1 to 6 carbon atoms, alkoxy having 1 to 6 carbon atoms, halogen, or aromatic having 6 to 9 carbon atoms. Examples of suitable dibenzoic acids include 4,4'-oxydibenzoic acid, 3,4'-oxydibenzoic acid, 4,4'-(p-phenylenedioxy)dibenzoic acid, and 3,3'-(p-phenylenedioxy)dibenzoic acid, including their acid halides, and the like.

After adding the graft monomer(s), the mixture is stirred at about room temperature for about 2 to 48 hours or until a clear homogeneous solution is obtained. The reaction temperature is then raised to about 130° C., and held at that temperature, with stirring, for about 8 to 96 hours.

Recovery of the graft copolymer from the reaction solution may be accomplished by precipitating the copolymer in a liquid, such as water or tetrahydrofuran, which is a non-solvent for the copolymer, followed by filtration and drying.

Thus, in accordance with the present invention, graft copolymers of articulated rod-like poly(p-phenylenebenzbisthiazole) and poly(p-phenylenebenzbisoxazole) can be synthesized through stepwise grafting of flexible poly(etherketone) and/or poly(etheretherketone) sidechains onto the rod-like structures using the diphenoxybenzene "swivel" structures within the polymer backbone as the graft sites. The composition of the resulting thermooxidatively stable copolymers can be controlled through the number of graft sites within the polymer backbone as well as by the quantity of side-chain monomers charged into the grafting reaction, the latter being carried out completely in solution in a homogeneous MSA/$P_2O_5$ reaction medium. Incorporation of the flexible sidechains into the rigid-rod molecule has a beneficial effect on polymer solubility and fusibility while incurring little sacrifice in polymer thermooxidative stability. The graft copolymers exhibit sufficient fusibility to permit consolidation of the neat materials into useful bulk forms which exhibit good mechanical properties as well as high thermooxidative and chemical stability. The graft copolymers of this invention thus effectively function as a one-part molecular composite in which the rigid-rod backbone and fusible host are contained within a single polymer molecule. Because of their superior thermooxidative stability, mechanical properties and processibility, these graft copolymers may be used to replace fiber-reinforced epoxy composites in a variety of applications.

The following examples illustrate the invention. In the examples, the APBT and APBO copolymers were synthesized as described in the aforementioned U.S. Pat. No. 4,229,566, through the copolycondensation in polyphosphoric acid (PPA) of 2,5-diamino-1,4-benzenedithiol dihydrochoride and 4,6-diamino-1,3-benzenediol dihydrochloride, respectively, with terephthalic acid or terephthaloyl chloride and 4,4'-(o-phenylenedioxy)dibenzoyl chloride.

EXAMPLE I

Preparation of APBT-g-PEK

APBT ($[\eta]=11.1$ dl/g, methanesulfonic acid, 30° C.) (1.423 g) was stirred under nitrogen at room temperature in a solution of phosphorus pentoxide (7.1 g) in methanesulfonic acid (71 g). After a clear golden yellow solution was formed, m-phenoxybenzoic acid (PBA) (6.42 g) was added. After stirring for four hours, a clear solution was formed and the reaction temperature was slowly raised to 130° C. After being allowed to stir for 24 hours, the resultant dark red viscous solution was poured slowly into ice-cooled tetrahydrofuran to precipitate the graft copolymer while allowing any unattached PEK which may have been formed to stay in solution. The precipitated graft copolymer was isolated by filtration, washed with water several times in a mechanical blender, then extracted with water in a continuous extraction apparatus for 24 hours. Upon drying at 100° C. in vacuo, the graft copolymer was extracted with methylene chloride in a continuous extraction apparatus for 24 hours. The dark red fibrous material was dried at 100° C. in vacuo for 24 hours to give 3.92 g of APBT-g-PEK with an intrinsic viscosity of 4.1 dl/g (methanesulfonic acid, 30° C.).

EXAMPLE II

Preparation of APBT-g-PEEK

APBT ($[\eta]=19.0$ dl/g, methanesulfonic acid, 30° C.) (2.846 g) was stirred under nitrogen at room temperature in a solution of phosphorus pentoxide (19.2 g) in methanesulfonic acid (192 g). After a clear golden yellow solution was formed, 1,4-diphenoxybenzene (1.96455 g, 7.49 mmol) and 4,4'-oxydibenzoic acid (PBA) (1.93466 g, 7.49 mmol) were added. After stirring for 24 hours, a clear solution was formed and the reaction temperature was slowly raised to 120° C. After being allowed to stir for 24 hours, the resultant dark red viscous solution was poured slowly into water to precipitate the graft copolymer while allowing any unattached PEK which may have been formed to stay in solution. The precipitated graft copolymer was isolated by filtration, washed with water several times in a mechanical blender, then extracted with water in a continuous extraction apparatus for 24 hours. The dark red fibrous material was dried at 100° C. in vacuo for overnight to give APBT-g-PEEK with an intrinsic viscosity of 5.6 dl/g (methanesulfonic acid, 30° C.).

EXAMPLE III

Preparation of APBO-g-PEK

APBO ($[\eta]=3.3$ dl/g, methanesulfonic acid, 30° C.) (1.423 g) was stirred under nitrogen at room temperature in a solution of phosphorus pentoxide (7.1 g) in methanesulfonic acid (71 g). After a clear dark yellow solution was formed, m-phenoxybenzoic acid (PBA) (3.21 g) was added. After stirring for several hours, a clear solution was formed and the reaction temperature was slowly raised to 130° C. After being allowed to stir for 24 hours, the resultant dark red viscous solution was poured slowly into ice-cooled tetrahydrofuran to precipitate the graft copolymer while allowing any unattached PEK which may have been formed to stay in solution. The precipitated graft copolymer was isolated by filtration, washed with water several times in a mechanical blender, then extracted with water in a continuous extraction apparatus overnight. Upon drying at 100° C. in vacuo, the graft copolymer was extracted with methylene chloride in a continuous extraction apparatus for 24 hours. The dark brown material was dried at 100° C. in vacuo to give 2.24 g of APBO-g-PEK with an intrinsic viscosity of 3.05 dl/g (methanesulfonic acid, 30° C.).

EXAMPLE IV

Synthesis of APBT-g-PEK Graft Copolymers

A series of APBT-g-PEK graft copolymers was prepared generally following the procedure given in Example I. The results are given in Table I, below. The entry for Trial 1 reflects the synthesis and results given in Example I.

TABLE I

| Trial No | Synthesis of APBT-g-PEK | | | | | | | |
|---|---|---|---|---|---|---|---|---|
| | 1 | 2 | 3 | 4 | 5 | 6 | 7 | 8 |
| APBT (mole % graft site) | 9.1 | 9.1 | 9.1 | 10 | 10 | 5 | 5 | 5 |
| Monomer Compn (APBT/PBA) | | | | | | | | |
| wt/wt | 31/69 | 31/69 | 31/69 | 30/70 | 21/79$^x$ | 30/70 | 30/70 | 21/79$^x$ |
| mole/mole$^y$ | 1/33 | 1/33 | 1/33 | 1/31 | 1/47 | 1/60 | 1/60 | 1/91 |
| Temperature (°C.) | 130 | 100 | 130 | 120 | 120 | 120 | 120 | 120 |
| Time (hrs) | 24 | 72 | 24 | 24 | 24 | 24 | 48 | 48 |
| % PEK attached | 78 | 25 | 75 | 31 | 55 | 21 | 35 | 77 |
| Copolymer Compn (APBT/PEK) | | | | | | | | |
| wt/wt | 36/64 | 64/36 | 40/60 | 60/40 | 37/63 | 61/39 | 57/43 | 29/71 |
| Attached PBA units per | 25 | 5 | 24 | 10 | 25 | 18 | 21 | 70 |

TABLE I-continued

| | Synthesis of APBT-g-PEK | | | | | | | |
|---|---|---|---|---|---|---|---|---|
| Trial No | 1 | 2 | 3 | 4 | 5 | 6 | 7 | 8 |
| Graft site | | | | | | | | |
| [η] APBT$^z$ | 11.1 | 11.1 | 14.4 | 13.8 | 13.8 | 17.5 | 17.5 | 15.4 |
| [η] APBT-g-PEK$^z$ | 4.1 | 6.3 | 6.7 | 7.1 | 6.0 | 6.7 | 6.0 | 4.9 |

$^x$3-Phenoxybenzoyl chloride used as monomer
$^y$Based upon diphenoxybenzene graft sites
$^z$MSA, 30° C.

EXAMPLE V

Compression Molding

Powder specimens of APBT-g-PEK copolymers were consolidated into bulk articles by compression molding at about 280° C., providing bulk composites reinforced isotropically by the articulated PBT. For 36/64 rod/coil composition, the composite is believed to be reinforced by molecularly dispersed rigid-rod polymer, resulting in a true bulk rigid-rod molecular composite. The bulk composite exhibited no phase separation, no aggregation of the rod component and no PEK glass transition temperature. This composite had a three-dimensional isotropic tensile modulus. For higher rod/coil compositions, i.e., 64/36 and 57/43, the copolymer powder exhibited some aggregation of the rod component, leading to less efficient reinforcement by the rod component and less than the optimum expected modulii. The tensile properties of three of the processed APBT-g-PEK graft copolymers are shown in Table II, below.

TABLE II

| Isotropic Properties of APBT-g-PEK Bulk Molecular Composites | | | | |
|---|---|---|---|---|
| | APBT/PEK ratio | Tensile Properties | | |
| Trial No. | (wt/wt) | E (Msi) | σ (Ksi) | ε (%) |
| 1 | 36/64 | 1.1 | >5.41 | >0.6 |
| 2 | 64/36 | 1.4 | 2.44 | 0.2 |
| 7 | 57/43 | 1.0 | 2.85 | 0.3 |

The graft copolymers described above were obtained as fibrous, dark yellow to dark red materials. The successful incorporation of PEK or PEEK into the APBT or APBO structure was substantiated by infrared spectral analysis. In all cases, a band at 1650 cm$^{-1}$ attributable to aromatic ketone was observed, as well as a substantially increased absorption at 1250 cm$^{-1}$ attributable to aromatic ether structure. Further evidence of successful grafting reaction was given by comparison of the dilute solution viscosity plots, wide angle X-ray photographs, and scanning electron microscope photographs of the APBT-g-PEK copolymers as compared to identically constituted mechanical mixtures of APBT and PEK. Substantial differences were observed, the most important being the complete absence of aggregation of the APBT in the graft copolymers at APBT content of 36% (w/w) or less.

The solubility of the articulated rod-like polymers was modified by the grafting procedures. While the articulated rod-like polymers were soluble only in methanesulfonic acid and polyphosphoric acid, the graft copolymers also exhibited solubility in trifluoroacetic acid.

The thermooxidative stability of the graft copolymers was quite high, although a slight penalty in stability was incurred through the incorporation of the PEK or PEEK side-chains into the very stable articulated structures. Under thermogravimetric analysis in air, substantial breakdown did not occur in most cases until the 430° to 450° C. range.

Differential scanning calorimetry did not detect any softening of the graft copolymers at higher temperatures. These materials could, however, be processed into strong molded samples through the application of elevated temperatures and pressure. Morphological examination of the molded specimens indicated a high degree of consolidation, limited or no phase separation and concurrent domain formation between the rigid-rod backbone and flexible side-chains.

Various modifications may be made to the invention as described without departing from the spirit of the invention or the scope of the appended claims.

We claim:

1. A method for making a fusible, rod-like graft copolymer having repeating units of the formula:

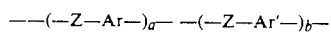

wherein a ranges from about 0.75 to 0.97 and b is 1 − a; wherein Z is

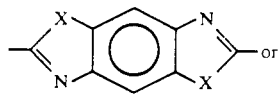

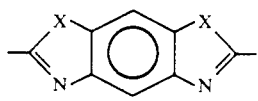

wherein X is —O— or —S—;
wherein Ar is

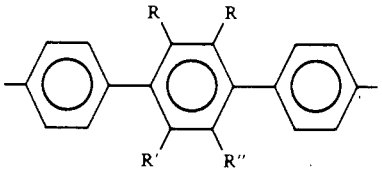

wherein R is a monovalent aromatic radical, and R' and R" are individually selected from the group consisting of hydrogen, a monovalent aromatic radical, a monovalent aliphatic radical, a monovalent cycloaliphatic radical, and a monovalent heterocyclic radical;
wherein Ar' is

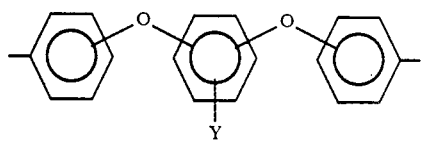

and wherein Y is a poly(etherketone) having repeating units of the formula

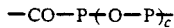

wherein P is a divalent phenylene or substituted phenylene moiety and c is an integer having a value of 1 to 4, which comprises the steps of dissolving an aromatic, para-oriented polymer having repeating units of the formula:

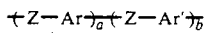

wherein Z, Ar, Ar', a and b are as defined previously, wherein Y is —H, in a mixture of methanesulfonicacid and phosphorus pentoxide, adding a phenoxybenzoic acid to the reaction mixture, stirring the mixture at about room temperature for about 2 to 48 hours, raising the reaction temperature, stirring the reaction mixture at about 130° C. for about 8 to 96 hours, and recovering said copolymer.

2. The method of claim 1 wherein the quantity of phenoxybenzoic acid is about 1 to 10 moles per mole of polymer.

3. A method for preparing a fusible, rod-like graft copolymer having repeating units of the formula:

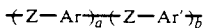

wherein a ranges from about 0.75 to 0.97 and b is 1−a;
wherein Z is

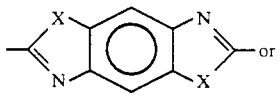

wherein X is —O— or —S—;
wherein Ar is

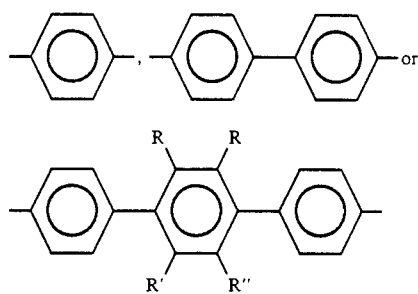

wherein R is a monovalent aromatic radical, and R' and R" are individually selected from the group consisting of hydrogen, a monovalent aromatic radical, a monovalent aliphatic radical, a monovalent cycloaliphatic radical, and a monovalent heterocyclic radical;
wherein Ar' is

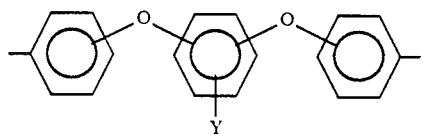

and wherein Y is a poly(etheretherketone) having repeating units of the formula

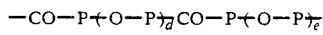

wherein P is a divalent phenylene or substituted phenylene moiety, d is an integer having a value of 1 to 4 and e is an integer having a value of 2 to 5, which comprises the steps of dissolving an aromatic, para-oriented polymer having repeating units of the formula:

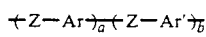

wherein Z, Ar, Ar', a and b are as defined previously, wherein Y is —H, in a mixture of methanesulfonicacid and phosphorus pentoxide, adding a mixture of an aromatic ether and an aromatic ether dibenzoic acid to the reaction mixture, stirring the mixture at about room temperature for about 2 to 48 hours, raising the reaction temperature, stirring the reaction mixture at about 130° C. for about 8 to 96 hours, and recovering said copolymer.

4. The method of claim 3 wherein the combined quantity of aromatic ether and aromatic ether dibenzoic acid is about 1 to 5 moles per mole of polymer.

* * * * *